US009075983B2

(12) United States Patent
Foote

(10) Patent No.: US 9,075,983 B2
(45) Date of Patent: Jul. 7, 2015

(54) MORE SECURE IMAGE-BASED "CAPTCHA" TECHNIQUE

(75) Inventor: Evan Michael Foote, Carmel, IN (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/003,814

(22) PCT Filed: May 26, 2011

(86) PCT No.: PCT/US2011/038031
§ 371 (c)(1),
(2), (4) Date: Sep. 9, 2013

(65) Prior Publication Data
US 2013/0347090 A1 Dec. 26, 2013

(51) Int. Cl.
G06F 21/00 (2013.01)
H04L 9/32 (2006.01)
G06F 7/04 (2006.01)
G06F 12/14 (2006.01)
G06F 21/36 (2013.01)
G06F 21/31 (2013.01)
H04L 29/06 (2006.01)

(52) U.S. Cl.
CPC .............. *G06F 21/36* (2013.01); *H04L 63/083* (2013.01); *H04L 63/08* (2013.01); *H04L 63/1408* (2013.01); *G06F 21/31* (2013.01)

(58) Field of Classification Search
CPC ... H04L 63/08; H04L 63/083; H04L 63/1408; G06F 21/31; G06F 21/36

USPC ...................... 726/7, 5, 22; 713/168, 183, 184
See application file for complete search history.

(56) References Cited

U.S. PATENT DOCUMENTS

| 6,195,698 | B1 | 2/2001 | Lillibridge et al. |
| 7,624,277 | B1 | 11/2009 | Simard et al. |
| 2009/0187986 | A1 | 7/2009 | Ozeki |
| 2009/0307765 | A1 | 12/2009 | Mardikar et al. |
| 2009/0319270 | A1 | 12/2009 | Gross |
| 2010/0046790 | A1 | 2/2010 | Koziol et al. |
| 2010/0095350 | A1 | 4/2010 | Lazar et al. |
| 2010/0161927 | A1 | 6/2010 | Sprouse et al. |
| 2010/0281526 | A1 | 11/2010 | Raghavan |
| 2011/0106631 | A1* | 5/2011 | Lieberman et al. ........ 705/14.72 |
| 2011/0202762 | A1* | 8/2011 | Hadad et al. .................. 713/164 |

OTHER PUBLICATIONS

Kolupaev et al., "CAPTCHAs: Humans vs. Bots", IEEE Security and Privacy, IEEE Computer Society, New York, NY, US, vol. 6, No. 1, Jan. 1, 2008, pp. 68-70.

* cited by examiner

*Primary Examiner* — Aravind Moorthy
(74) *Attorney, Agent, or Firm* — Robert D. Shedd; Robert B. Levy

(57) ABSTRACT

A more secure CAPTCHA makes use of a distorted alphanumeric character string or strings that include one or more glyphs, pictures or symbols foreign to a target audience. Adding at least one of a glyph, picture or symbol makes recognition of the distorted string trivial since humans who would know which of the character set to expect, but a very difficult decision for a computer already struggling to decide where a character begins and ends, let alone identifying the character as being valid.

11 Claims, 3 Drawing Sheets

MORE SECURE IMAGE-BASED "CAPTCHA" TECHNIQUE

TECHNICAL FIELD

This invention relates to a technique enhanced security for data entry.

BACKGROUND ART

To gain access to a web site offering secure content, such as a site maintained by a financial organization, a user enters verification information typically comprised of a user log-in and a password or Personal Identification Number (PIN). The user log-in specifically identifies the user; whereas the password or PIN comprises a secret code that only the user and the web site know, thereby preventing unauthorized access by upon entry of the user long-in alone. Web sites that offer unsecure content, for example the content provided by a newspaper or the like, typically do not require a high level of security. At best, such sites may only require a user to enter a log-in for the purpose of tracking customer usage.

Web sites with easy user access remain vulnerable to repeated automated access by computers. To allow for individual access by a human being but reduce in not eliminate repeated automated access by computers, many web sites make use of a Completely Automated Public Turing test to tell Computers and Humans Apart" (CAPTCHA). A typical CAPTCHA takes the form of a display of one or more sets of alphanumeric characters (typically, although not necessarily in the form of one or more words) obscured in some manner so as to be recognizable by a human being but unrecognizable by a computer, even with the aid of known computer-based imaging techniques. A user seeking access must decipher the obscured word or words and enter them to successfully gain access. The inability of a computer to decipher the obscured word or words thus prevents automated access.

Advances in computer-aided image recognition techniques have made present-day CAPTCHAs less secure. Thus, a need exists for a CAPTCHA having enhanced security.

BRIEF SUMMARY OF THE INVENTION

Briefly, in accordance with a preferred embodiment of the present principles, a technique for authorizing access, such as access to web site, commences by generating for display at least one distorted string of alphanumeric characters, in combination with at least one of a glyph, picture or symbol, the glyph, picture or symbol being foreign to a target audience. (A glyph constitutes an individual mark on a written medium that contributes to the meaning of what is written.). The response of a user entered to in reaction to the distorted string of alphanumeric characters is compared to a reference string of characters to determine whether to grant access.

DETAILED DESCRIPTION

Figure 1:
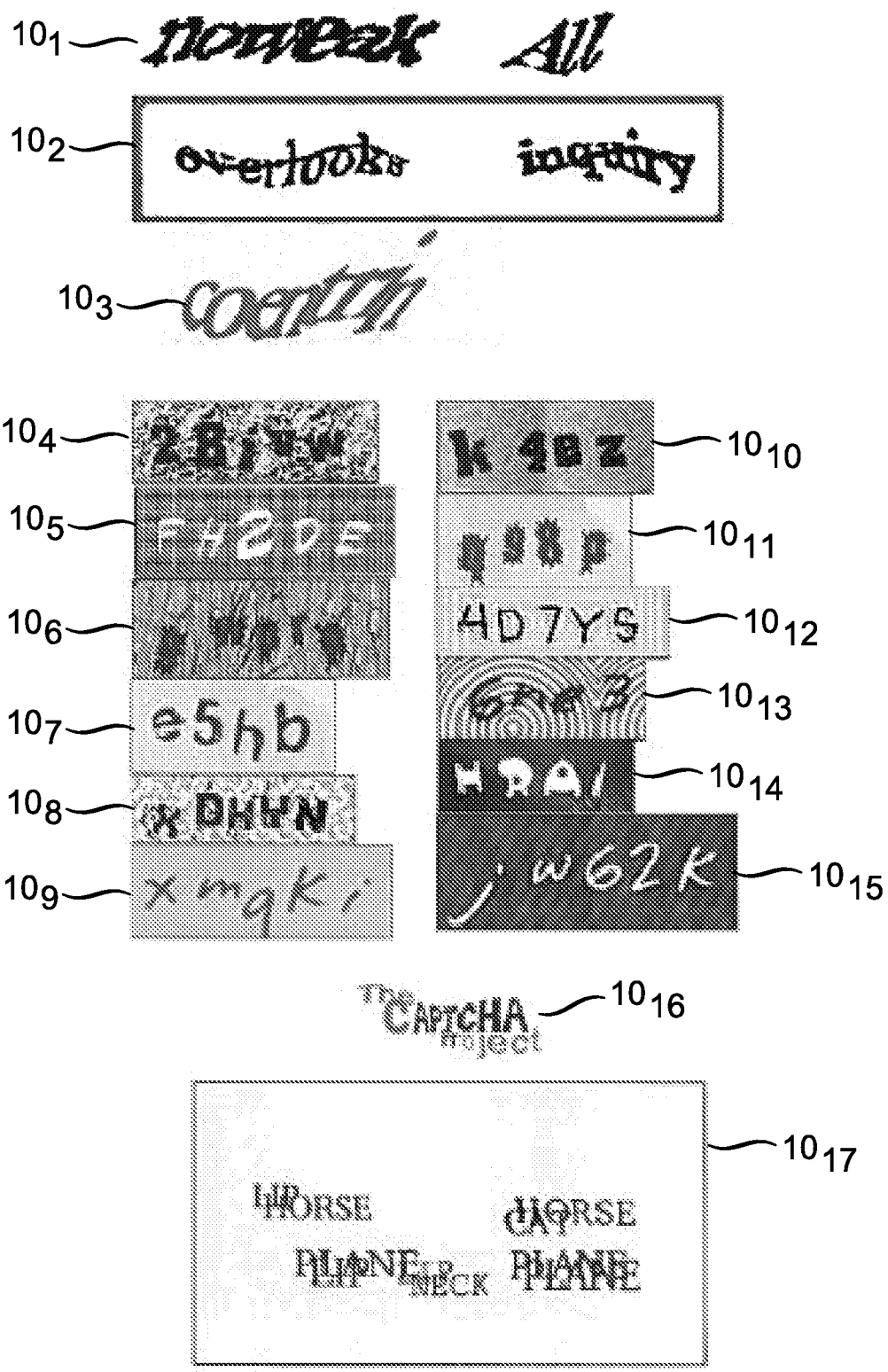
FIG. 1 depicts various examples of distorted strings of alphanumeric characters used in present day CAPTCHAs.

To reduce the incidence of unwanted repeated access through automated means, website operators often employ a Completely Automated Public Turing test to tell Computers and Humans Apart (CAPTCHA). To gain access to a web site which employs a CAPTCHA, the user must successfully enter a string of alphanumeric characters purposely distorted to make computer-aided image recognition difficult if not impossible. FIG. 1 depicts distorted alphanumeric strings $10_1$-$10_{17}$ exemplary of the distorted alphanumeric strings used as part of present day CAPTCHAs. The distorted alphanumeric strings $10_1$-$10_{17}$ depicted in FIG. 1 represents examples of various distortion techniques including:

Adding lines or dashes through one or more words;
Running the original letters together;
Adding different contrasting backgrounds;
Inter-mixing the background and the words;
Changing the font between different alphanumeric strings;
Using more than one word in a string; and
Using non-words (gibberish) in a character string The above-described distortion techniques, while effective in the past, will likely become less secure in the future as computer-aided imaging techniques improve. Thus, a need exists for a more secure CAPTCHA.

In accordance a preferred embodiment of the present principles, a more secure CAPTCHA makes use of a distorted alphanumeric character string or strings that include glyphs, pictures or symbols foreign to a target audience. (A glyph constitutes an individual mark on a written medium that contributes to the meaning of what is written.) A glyph used in any of the above CAPTCHAs would require the use of sophisticated computer imaging to recognize individual characters in order to determine which characters to discard. This process constitutes a trivial task for humans who would know which of the character set to expect, but a very difficult decision for a computer already struggling to decide where a character begins and ends, let alone identifying the character as being valid.

Figure 2:
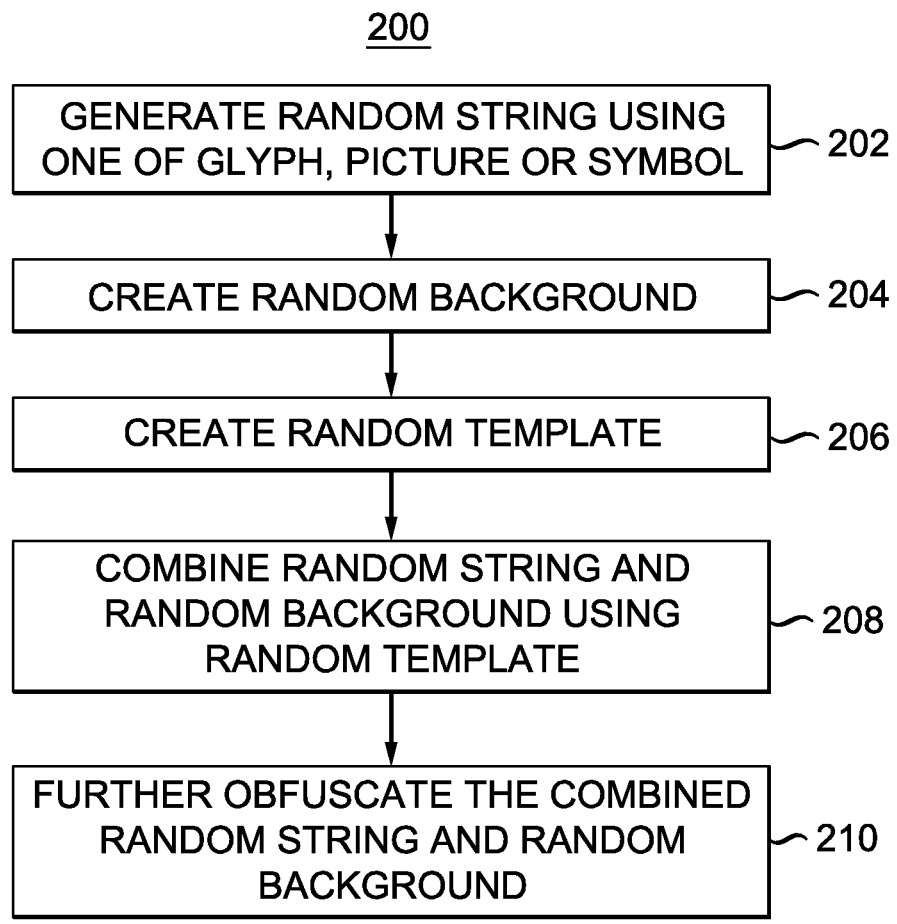
FIG. 2 depicts the steps of a method in accordance with a preferred embodiment of the present principles for generating a more secure distorted string of alphanumeric characters for use with a CAPTCHA.

FIG. 2 depicts in flow chart form the steps of a method 200 in accordance with the present principles for generating a distorted string of alphanumeric characters as part of a more secure CAPTCHA. Typically, the method 200 of FIG. 2 can be practiced by a processor (not shown). The method of FIG. 2 commences upon execution of step 202 at which time, at least one alphanumeric character string is generated comprising one or more randomly selected words or one or more strings of randomly selected characters. Next, step 204 undergoes execution during which a random background gets generated. The random background can include one or more randomly selected colors, shapes, features and/or textures. Following step 204, step 206 undergoes execution to create a random template specifying the manner in which combination the random alphanumeric string or strings and the random background should occur. During step 208, the random alphanumeric string or strings get combined with the random background using the template created during step 206. To the extent desirable, further obfuscation of the random alphanumeric string or strings and/or the random background can occur during step 210 such as by mixing the background and the random alphanumeric string or strings, although such further obfuscation is not necessary.

Figure 3:
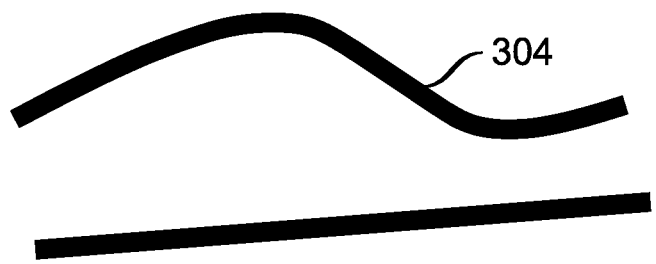
FIG. 3 graphically depicts the use of a glyph to a random alphanumeric string using the method of FIG. 2.

FIG. 3 graphically depicts the generation of at least one glyph and the addition of that glyph to one or more of the end(s) of one or more random alphanumeric strings to generate a more secure CAPTCHA in accordance with the present principles. For the purposes of example, assume generation of a random alphanumeric string comprising the word "confidential" depicted by element 300 in FIG. 3. The random word "confidential" then undergoes separation into two separate strings 301a and 301b, the first comprising the letters "confide", and the second string comprising the letters "ntial". A glyph 302a, comprising the Greek letters epsilon (small) and delta (small) is generated. The Greek letters within the glyph 302a are concatenated to yield the glyph 302b added to either to the end of the string 301a or the beginning of string 301b. The concatenation of the strings 301a and 301b with the attached glyph 302b yields string 303. Element 304 in FIG. 3 represents a random template, which when applied to the string 303 yields a string 305 which can be further obfuscated to yield the string 306.

The presence of the glyph 302b within the string 306 will not impair human recognition of the word "confidential" since a human will likely ignore the glyph 302b as being irrelevant. However, attempting to recognize the string 306 as the word "confidential" using computer-imaging techniques will likely fail since such techniques will always seek to identify the glyph as an alphanumeric character. Substituting a picture or symbol in place of the glyph 302b will also greatly impede recognition of the string 306 of FIG. 3 using computer-imaging techniques.

The foregoing describes a method for achieving more secure CAPTCHA.

The invention claimed is:

1. A method for authorizing access, comprising the step of:
    generating for display at least one distorted string of alphanumeric characters, in combination with at least one of a glyph, picture or symbol, the glyph, picture or symbol being foreign to a target audience, wherein the generating includes separating the at least one distorted string of alphanumeric characters into two or more strings, and adding the at least one glyph, picture or symbol to one or more ends of the two or more strings to form at least one string of random alphanumeric characters that includes at least one of the glyph, picture or symbol; and
    comparing a response of a user entered in reaction to the distorted string of alphanumeric characters to a reference string of characters to determine whether to grant access.

2. The method according to claim 1 wherein the generating for display step further comprises the steps of:
    generating a random background; and
    combining the random background with the at least one string of random alphanumeric characters that includes at least one of the glyph, picture or symbol, using a random template.

3. The method according to claim 2 wherein the random background has one or more randomly selected colors, shapes, features and/or textures.

4. The method according to claim 2 further including the step of obfuscating the at least one string of random alphanumeric characters that includes at least one of the glyph, picture or symbol, using a random template.

5. The method according to claim 4 wherein the obfuscating step includes mixing the background and the at least one random alphanumeric string.

6. The method according to claim 1 wherein the at least one string of random alphanumeric characters comprises at least one word.

7. A method for authorizing access, comprising the step of:
    generating for display at least one distorted string of alphanumeric characters, in combination with at least one of a glyph, picture or symbol, the glyph, picture or symbol being foreign to a target audience, the generating step including:
        generating a random background;
        separating the at least one distorted string of alphanumeric characters into two or more strings, and adding at least one of the glyph, picture or symbol to one or more ends of the two or more strings to form at least one string of random alphanumeric characters that includes at least one of the glyph, picture or symbol; and
        combining the random background with the at least one string of random alphanumeric characters that includes at least one of the glyph, picture or symbol, using a random template; and
    comparing a response of a user entered in reaction to the distorted string of alphanumeric characters to a reference string of characters to determine whether to grant access.

8. The method according to claim 7 wherein the at least one string of random alphanumeric characters comprises at least one word.

9. The method according to claim 7 wherein the random background has one or more randomly selected colors, shapes, features and/or textures.

10. The method according to claim 7 further including the step of obfuscating the at least one string of random alphanumeric characters that includes at least one of the glyph, picture or symbol, using a random template.

11. The method according to claim 10 wherein the obfuscating step includes mixing the background and the at least one random alphanumeric string.

* * * * *